United States Patent
Shiba et al.

(10) Patent No.: US 10,421,094 B2
(45) Date of Patent: Sep. 24, 2019

(54) DOCTOR BLADE, COATING DEVICE, AND METHOD FOR PRODUCING LAMINATED SEPARATOR

(71) Applicant: Sumitomo Chemical Company, Limited, Chuo-ku, Tokyo (JP)

(72) Inventors: Ryutaro Shiba, Niihama (JP); Toshiki Innami, Niihama (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 0 days.

(21) Appl. No.: 15/451,794

(22) Filed: Mar. 7, 2017

(65) Prior Publication Data

US 2017/0259293 A1 Sep. 14, 2017

(30) Foreign Application Priority Data

Mar. 8, 2016 (JP) ................. 2016-044567

(51) Int. Cl.
| | |
|---|---|
| *B05C 1/08* | (2006.01) |
| *H01M 2/14* | (2006.01) |
| *H01M 2/16* | (2006.01) |
| *B05C 11/04* | (2006.01) |
| *B05D 1/28* | (2006.01) |

(52) U.S. Cl.
CPC .......... *B05C 1/0817* (2013.01); *B05C 11/045* (2013.01); *H01M 2/145* (2013.01); *H01M 2/1686* (2013.01); *B05D 1/28* (2013.01); *B05D 2252/02* (2013.01)

(58) Field of Classification Search
CPC ... H01M 2/145; H01M 2/1686; B05C 11/045; B05C 11/08; D21H 25/10; B05D 2252/02; B05D 1/28
USPC .......................................... 118/203, 261, 413
See application file for complete search history.

(56) References Cited

U.S. PATENT DOCUMENTS

| | | | | |
|---|---|---|---|---|
| 2002/0174966 A1* | 11/2002 | Brauns | ...................... | B32B 5/28 |
| | | | | 162/280 |
| 2007/0231465 A1* | 10/2007 | Hayashi | .............. | H01M 4/0404 |
| | | | | 427/58 |
| 2013/0049268 A1* | 2/2013 | Yoshida | .............. | B28B 19/0038 |
| | | | | 264/618 |

FOREIGN PATENT DOCUMENTS

JP          5742784 B2       7/2015

* cited by examiner

*Primary Examiner* — Laura Edwards
(74) *Attorney, Agent, or Firm* — Panitch Schwarze Bellisario & Nadel LLP

(57) ABSTRACT

Wearing down of a doctor blade by a filler contained in a coating solution is prevented. The doctor blade is for scraping off the coating solution, containing the filler, from a circumferential surface of a coating roller, the coating roller being for applying the coating solution to a battery member being conveyed. A surface of the doctor blade is made from an ultra-high molecular weight polyethylene.

4 Claims, 10 Drawing Sheets

FIG. 6
(a) STRAIGHT (EXAMPLE No. 16)
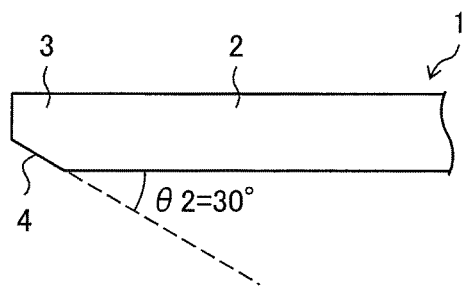
(b) STEPPED (EXAMPLE No. 19)
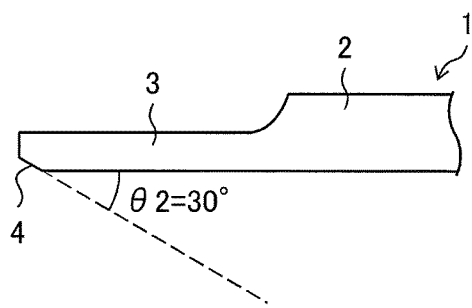
(c) TAPERED (EXAMPLE No. 22)
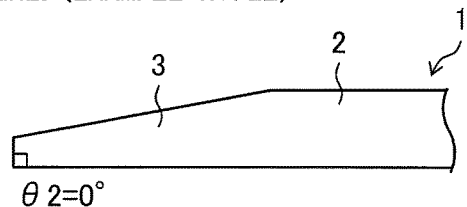

DOCTOR BLADE, COATING DEVICE, AND METHOD FOR PRODUCING LAMINATED SEPARATOR

This Nonprovisional application claims priority under 35 U.S.C. § 119 on Patent Application No. 2016-044567 filed in Japan on Mar. 8, 2016, the entire contents of which are hereby incorporated by reference.

TECHNICAL FIELD

The present invention relates to (i) a doctor blade for scraping off a coating solution, containing a filler, from a circumferential surface of a coating roller, the coating roller being for applying the coating solution to a battery member being conveyed, (ii) a coating device employing such a doctor blade, and (iii) a method for producing laminated separator, which method employs such a doctor blade.

BACKGROUND ART

In conventional art, a doctor blade is used to remove a paste, constituted by alumina powder and a binding agent mixed in a solvent, from a surface of a reverse gravure roll, which reverse gravure roll is used to form a heat-resistant layer of a separator for a lithium ion secondary battery by applying the paste to a resin original sheet serving as a resin part of the separator. The doctor blade disclosed in Patent Literature 1 has an edge section made of metal.

CITATION LIST

Patent Literature

[Patent Literature 1]
Specification of Japanese Patent No. 5742784 (Registration date: May 15, 2015)

SUMMARY OF INVENTION

Technical Problem

In prior art such as the above, the coating solution applied to form the heat-resistant layer of the separator contains a hard filler (such as alumina) in order to improve heat resistance. Such prior art therefore has the problem that the filler in the coating solution wears down the edge section of the doctor blade, which doctor blade is made from metal. A powder resulting therefrom (hereinafter also referred to as "abrasion powder"), which powder consists of metal, contaminates the separator as a conductive foreign substance and becomes a cause of short circuiting during battery production.

The present invention was made in view of the above problem. An object of the present invention is to provide (i) a doctor blade which prevents the creation of a conductive foreign substance in the form of a metallic abrasion powder even in a case where a surface of the doctor blade is worn down by a filler contained in a coating solution, (ii) a coating device employing such a doctor blade, and (iii) a method for producing laminated separator which method employs such a doctor blade.

Solution to Problem

In order to solve the above problem, a doctor blade in accordance with an embodiment of the present invention is a doctor blade for scraping off a coating solution, containing a filler, from a circumferential surface of a coating roller, the coating roller being for applying the coating solution to a battery member being conveyed, the doctor blade including: a surface made from a non-conductive material.

In order to solve the above problem, a coating device in accordance with an embodiment of the present invention includes: a coating roller for applying a coating solution, containing a filler, to a battery member being conveyed; and a doctor blade for scraping off the coating solution from a circumferential surface of the coating roller, the doctor blade including a surface made from a non-conductive material.

Advantageous Effects of Invention

An aspect of the present invention brings about an effect of providing a doctor blade, a coating device, and a method for producing laminated separator, each of which prevents an abrasion powder from causing battery malfunctioning such as short circuiting.

BRIEF DESCRIPTION OF DRAWINGS

FIG. 6 consists of diagrams illustrating edge shapes of the doctor blade. (a), (b), and (c) of FIG. 6 illustrate a straight shape, a stepped shape, and a tapered shape, respectively.

Figure 7:
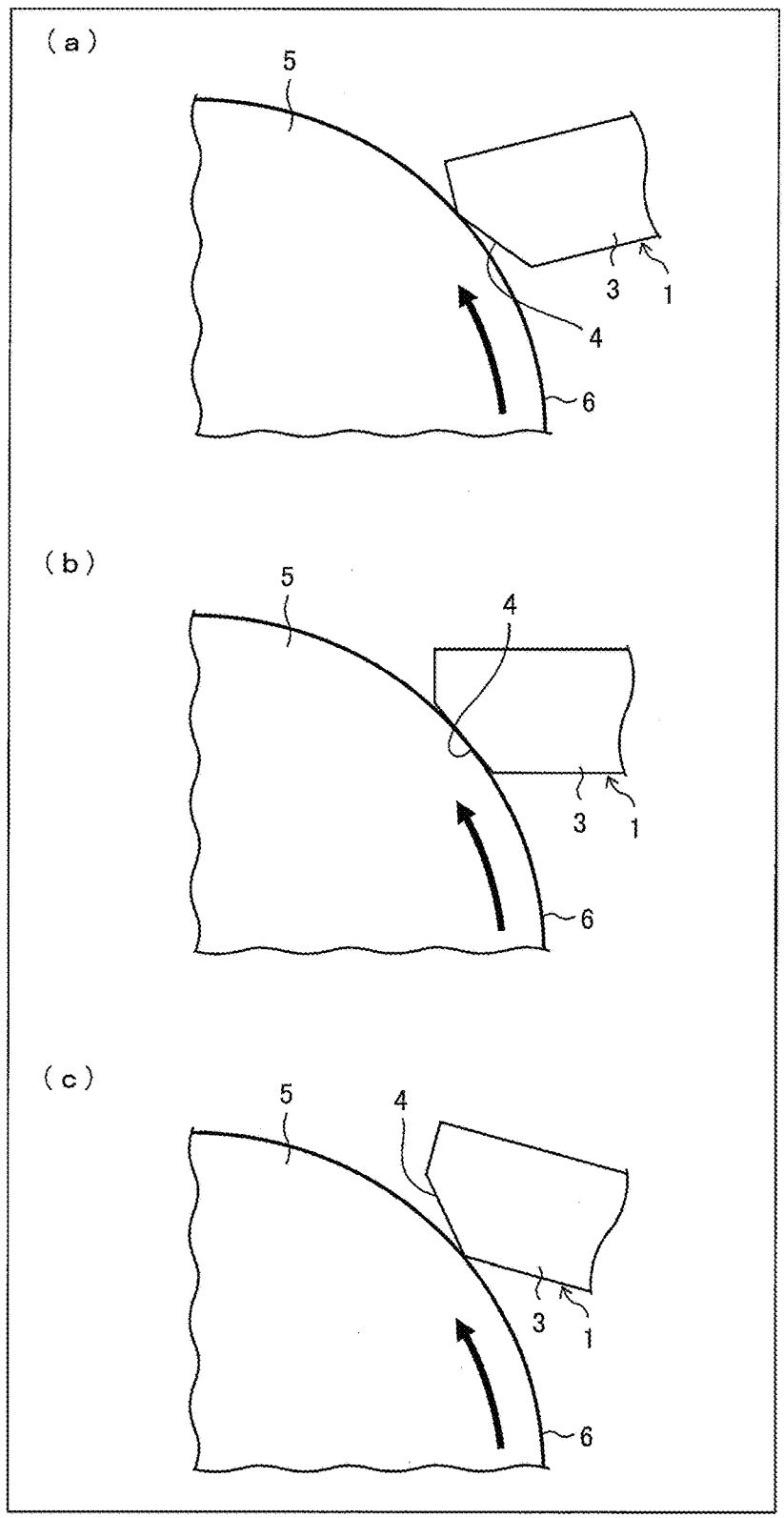

(a), (b), and (c) of FIG. 7 each illustrate a state of contact between (i) an edge section of the doctor blade and (ii) a circumferential surface of the coating roller.

Figure 8:
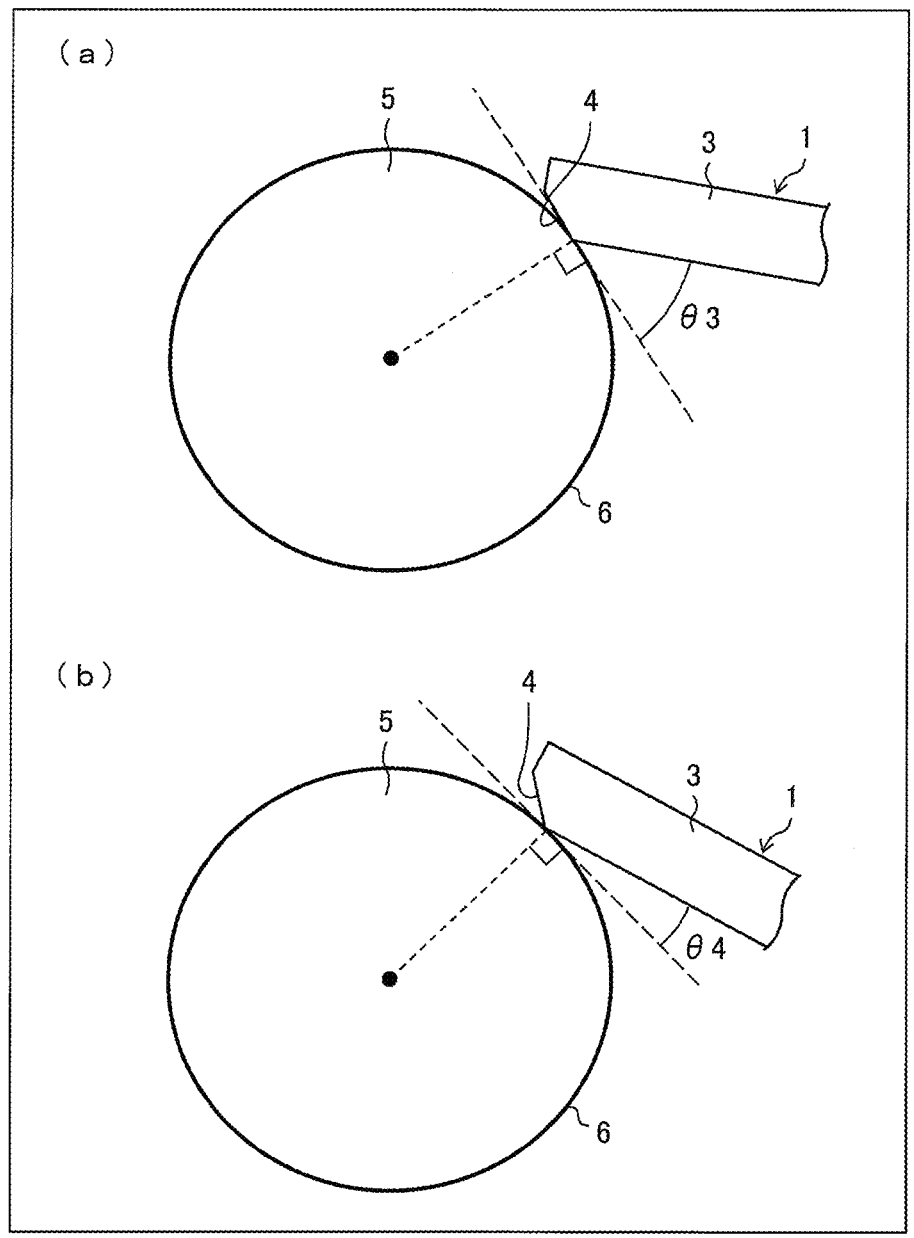

(a) and (b) of FIG. 8 are each a diagram for describing an angle of contact between (i) the edge section of the doctor blade and (ii) the circumferential surface of the coating roller.

Figure 9:
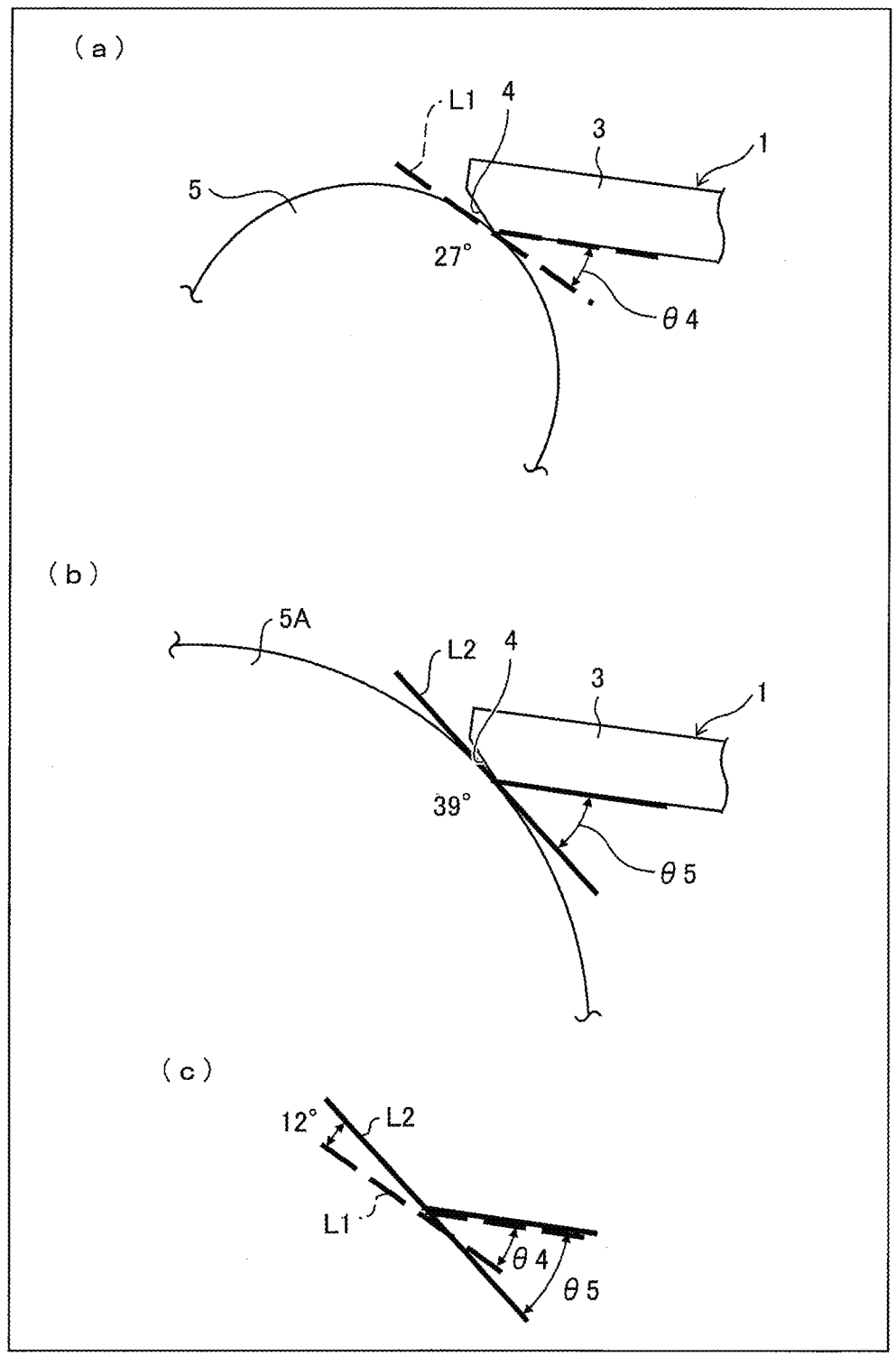

(a) of FIG. 9 is a schematic view for describing an angle of contact between the edge section of the doctor blade and a surface of the coating roller. (b) of FIG. 9 is a schematic view for describing an angle of contact between the edge section of the doctor blade and a surface of another coating roller. (c) of FIG. 9 is a schematic view for describing the difference between these two angles of contact.

Figure 10:
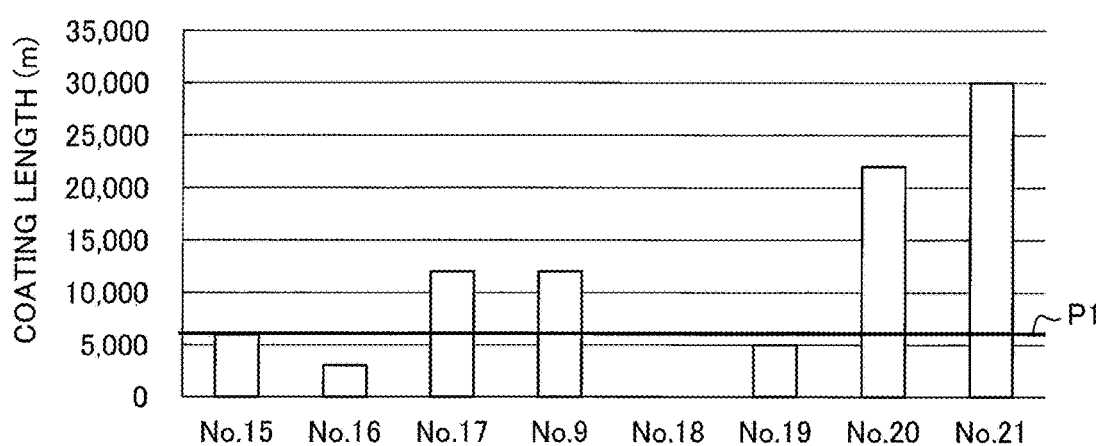

FIG. 10 is a graph showing, with regards to various doctor blades, a length for which coating was able to be performed while maintaining a favorable quality of scraping.

Figure 11:
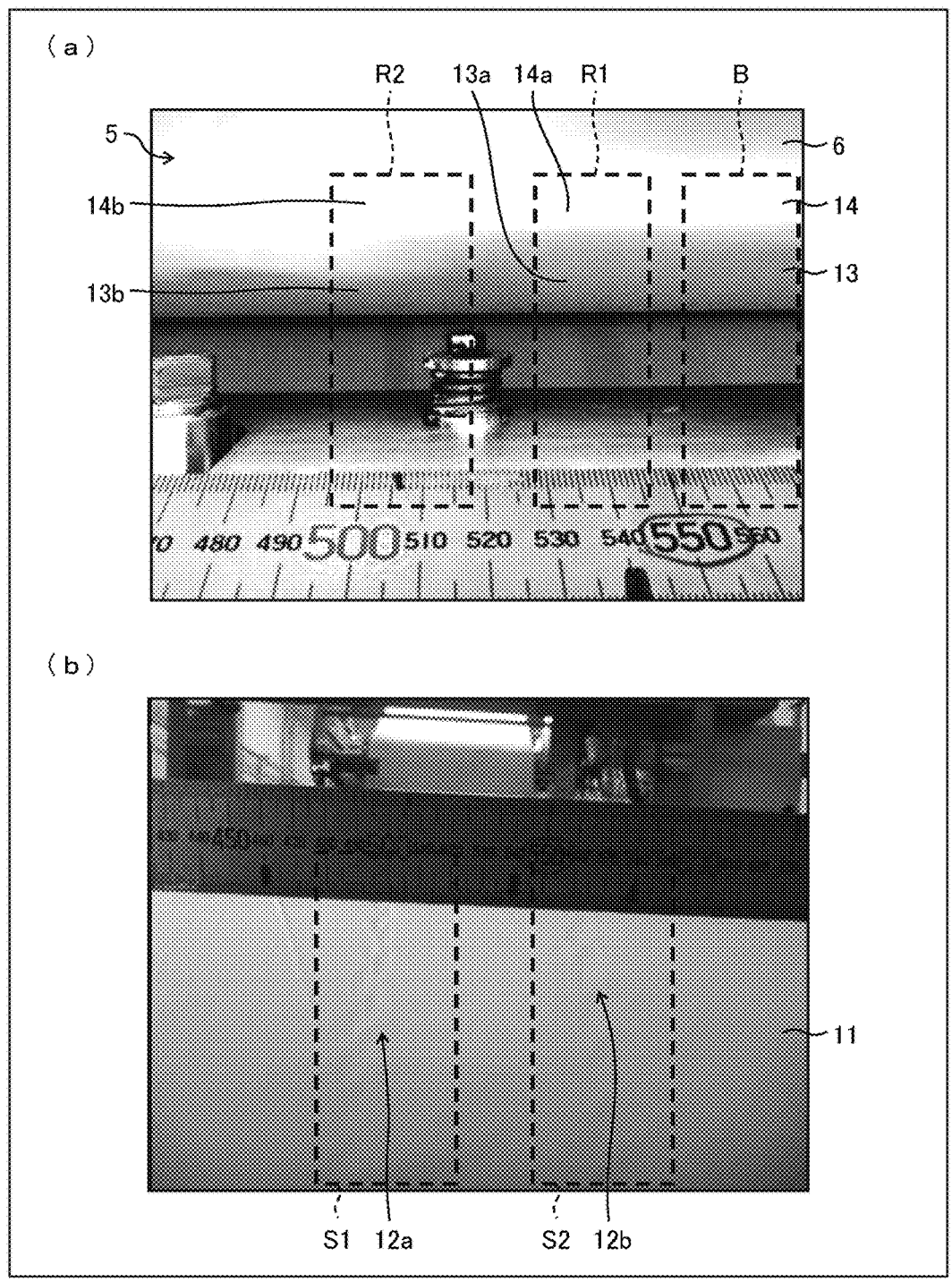

(a) of FIG. 11 is a photograph showing defective scraping off of the coating solution, from the circumferential surface of the coating roller, by the doctor blade during coating. (b) is a photograph showing wrinkles seen in a roll original sheet subsequent to coating.

Figure 12:
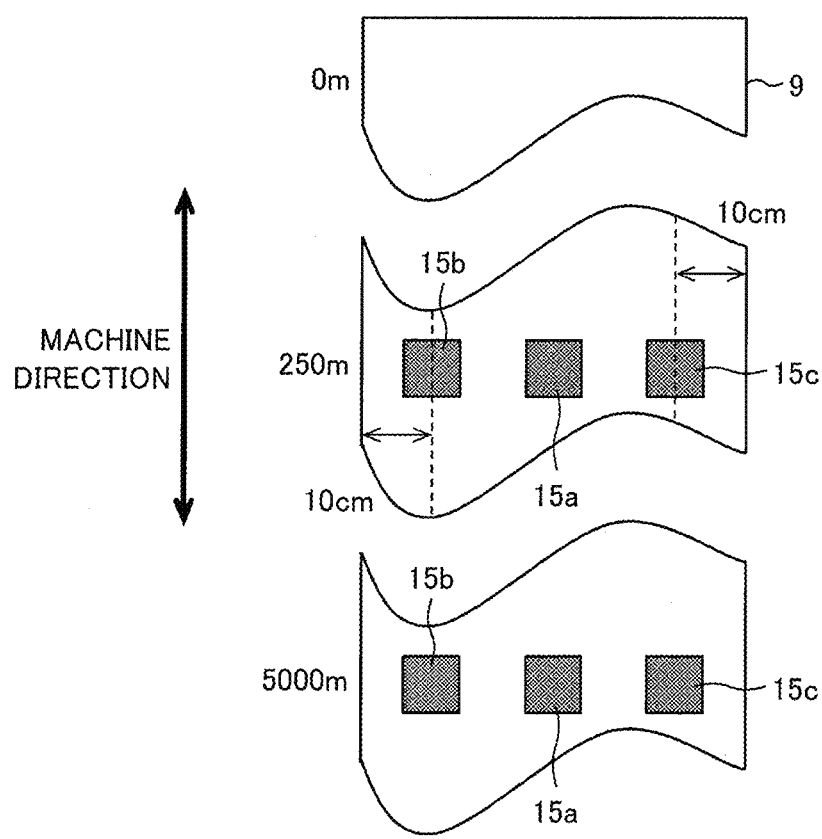

FIG. 12 is a diagram for describing a sampling method used for measuring a weight per unit area of a coating layer of a separator.

DESCRIPTION OF EMBODIMENTS

The following description will discuss, in detail, an embodiment of the present invention.

Embodiment 1

(Configuration of Coating Device 10)

Figure 1:
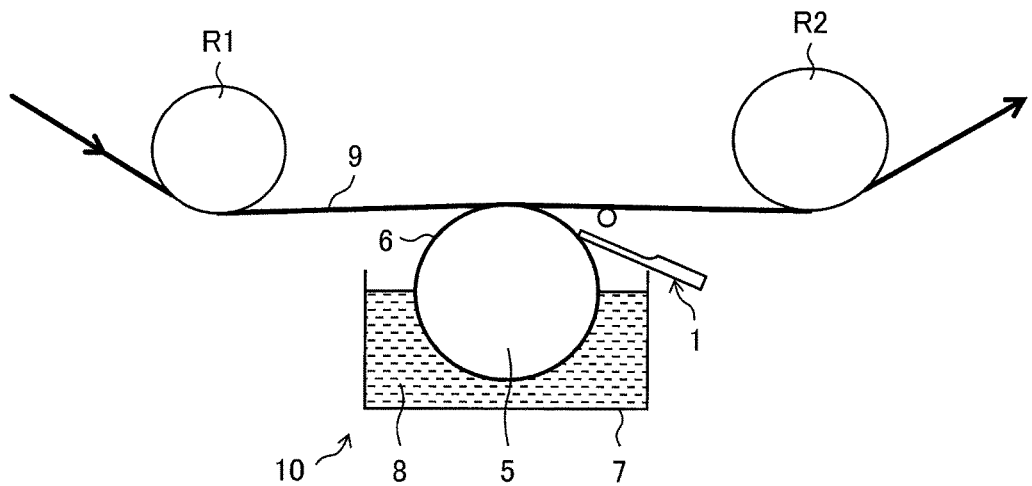
FIG. 1 is a diagram schematically illustrating a configuration of a coating device in accordance with Embodiment 1.

FIG. 1 is a diagram schematically illustrating a configuration of a coating device 10 in accordance with Embodiment 1. The coating device 10 applies a coating solution 8 to a separator 9 (battery member) being conveyed by transfer rollers R1 and R2. The coating solution 8 is contained in a container 7.

The coating device 10 includes a coating roller 5 which is partially immersed in the coating solution 8. The coating roller 5, which constitutes a gravure roll, applies the coating solution 8 to the separator 9 by rotating while in contact with the separator 9. The coating solution 8, being thusly applied to the separator 9, forms a coating layer (heat-resistant layer) on the separator 9. Thusly forming the coating layer on the separator 9 produces a laminated separator.

(Composition of Coating Solution 8)

The coating solution 8 contains a filler for enhancing heat resistance of the separator 9. In a case where the separator 9 is used as a battery separator, it is necessary for the filler, which will form a heat-resistant layer, to have a certain hardness or greater so as to prevent deformation and fragmentation of the heat-resistant layer stemming from outside forces such as expansion and contraction of the battery. Furthermore, since it is necessary for a cathode and anode of the battery to continue to be insulated from each other even after a base film of the separator 9 melts, the filler is required to have heat resistance. It is therefore preferable to use an inorganic filler (inorganic fine particles) as the filler, in order to satisfy such material property requirements.

Regarding hardness, the inorganic filler has as Mohs hardness which is preferably not less than 4, more preferably not less than 5, still more preferably not less than 6, and even still more preferably not less than 7. Examples of inorganic fillers having the above-specified Mohs hardness include fluorite (Mohs hardness: 4), barium titanate (Mohs hardness: 4.5), apatite (Mohs hardness: 5), glass (Mohs hardness: 5), orthoclase (Mohs hardness: 6), calcined kaolin (Mohs hardness: 6), magnesia (Mohs hardness: 6.5), silica (Mohs hardness: 7), zirconia (Mohs hardness: 7), titania (Mohs hardness: 7.5), and alumina (Mohs hardness: 9). Note that these inorganic fillers can be used individually or in a combination of two or more kinds. It is also possible to use a combination of (i) an inorganic filler having a Mohs hardness of less than 4 and (ii) an inorganic filler having a Mohs hardness of 4 or greater.

In terms of heat resistance and chemical stability, out of the above inorganic fillers, it is preferable to use an inorganic oxide; more preferable to use silica, zirconia, titania, and/or alumina; and particularly preferable to use alumina. Note that these inorganic fillers can be used individually or in a combination of two or more kinds.

(Configuration of Doctor Blade 1)

The coating device 10 includes a doctor blade 1. The doctor blade 1 scrapes off the coating solution 8 from a circumferential surface 6 of the coating roller 5.

Figure 2:
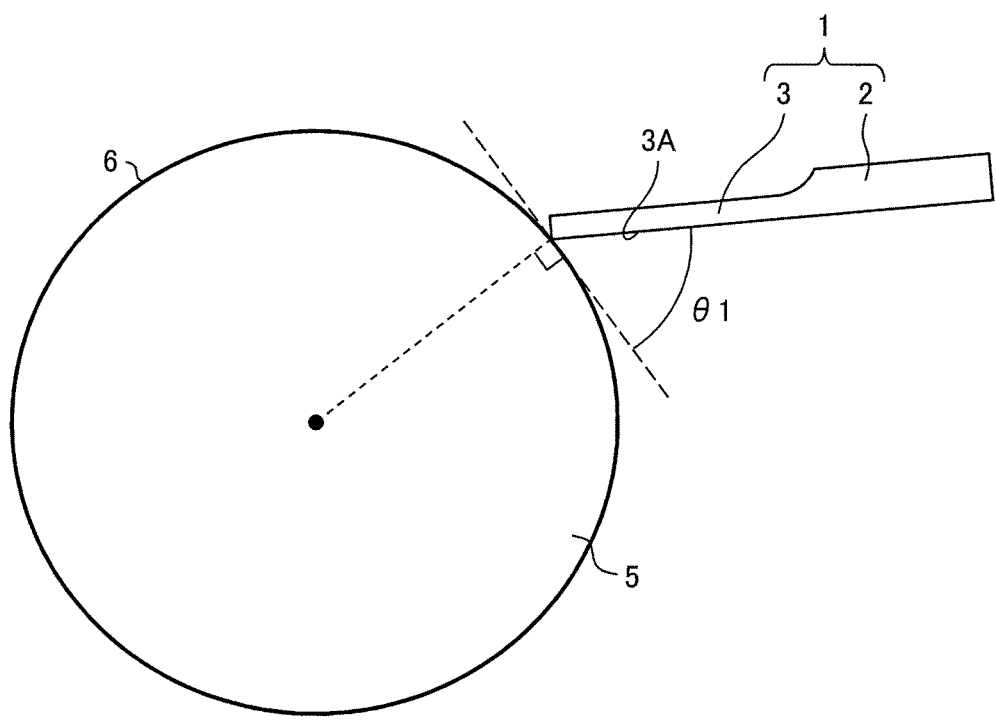
FIG. 2 is a diagram for describing a configuration of a doctor blade included in the coating device.
Figure 3:
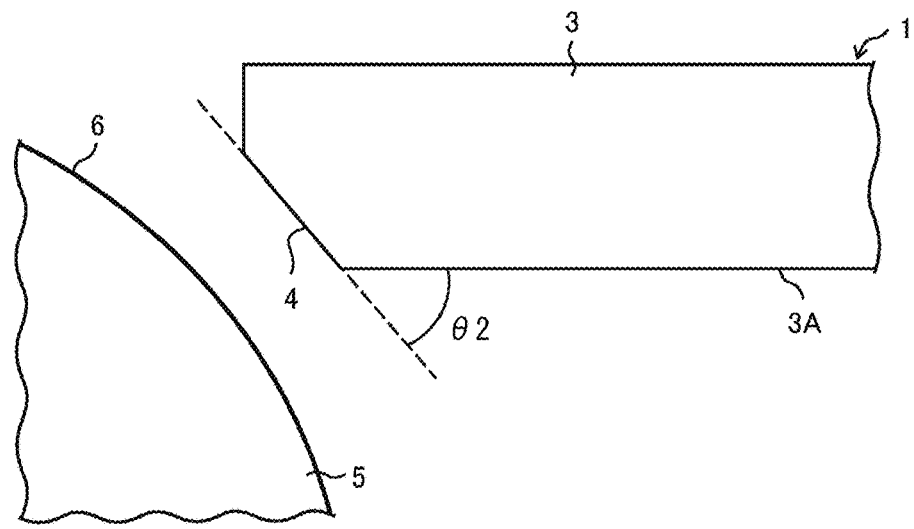
FIG. 3 is a diagram illustrating a configuration of an edge section of the doctor blade.

FIG. 2 is a diagram for describing a configuration of the doctor blade 1 included in the coating device 10. FIG. 3 is a diagram illustrating a configuration of an edge section 3 of the doctor blade 1.

The doctor blade 1 includes (i) a base section 2 which is plate-shaped and (ii) the edge section 3 which is plate-shaped and thinner than the base section 2, so that the doctor blade 1 has a stepped shape (this shape hereinafter also referred to as "stepped"). The edge section 3 has a contact surface 4 which is pressed onto the circumferential surface 6 of the coating roller 5. A bevel angle $\theta 2$ formed by the contact surface 4 and a surface 3A of the edge section 3 is (i) preferably less than 60° but not less than 30° and (ii) more preferably in a range from 40° to 50°. The doctor blade 1 has an angle of contact $\theta 1$ of 60°±10°, which angle of contact is formed by (i) a line tangent to the circumferential surface 6 at a point where the edge section 3 contacts the circumferential surface 6 and (ii) the surface 3A of the edge section 3.

The doctor blade 1 has a surface which is made from a non-conductive material. As such, the non-conductive material of the surface of the doctor blade 1 contacts the circumferential surface 6 of the coating roller 5. This means that even in a case where the doctor blade 1 is worn down by the filler contained in the coating solution 8 on the circumferential surface 6, any resulting abrasion powder is not conductive.

The non-conductive material need only cover at least a surface of the doctor blade 1. More specifically, the non-conductive material need only cover at least a surface of the edge section 3 of the doctor blade 1.

The non-conductive material covering the surface of the doctor blade 1 preferably has a thickness of not less than 0.5 mm. Setting the non-conductive material to have a thickness of less than 0.5 mm poses the risk of an underlying material being exposed due to abrasion of the surface of the doctor blade 1.

The non-conductive material of the surface of the doctor blade 1 preferably contains resin. The non-conductive material can contain a ceramic material. Preferable examples of the ceramic material include metal oxides, metal hydroxides, metal carbonates, metal carbides, metal nitrides, and amorphous carbon (diamond-like carbon). In terms of abrasion resistance and chemical stability, out of the above examples, it is preferable to use metal oxides, metal nitrides, metal carbides, and/or amorphous carbon, and more preferable to use aluminum oxide, silicon oxide, titanium oxide, zirconium oxide, yttrium oxide, titanium nitride, titanium carbonitride, titanium aluminum nitride, chromium nitride, titanium carbide, silicon carbide, and/or diamond-like carbon. In order to inhibit abrasion of the coating roller 5, these ceramic materials preferably have a hardness that is equivalent to or less than that of the surface of the coating roller 5.

Resin used in the surface of the doctor blade 1 preferably contains an ultra-high molecular weight polyethylene (UHPE). The resin can contain polyester.

The doctor blade 1 is preferably made from a non-conductive material and is more preferably made from resin, a ceramic material, or a mixture of resin and a ceramic material.

Since it is necessary for the doctor blade 1 to scrape off the coating solution 8 from the coating roller 5 in a uniform manner, it is preferable that at least the edge section 3 of the doctor blade 1 be made of a material having bending elasticity which material can bend when pressed onto the circumferential surface 6 of the coating roller.

(Durability of the Doctor Blade 1)

Figure 4:
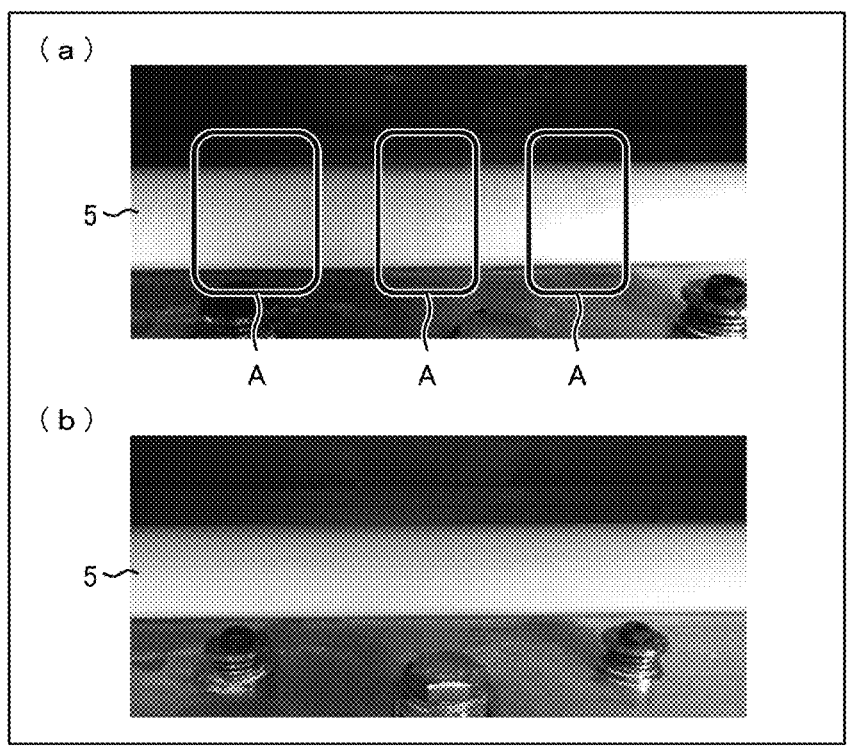
FIG. 4 consists of photographs each showing a state of a surface of a coating roller from which a coating solution has been scraped off by the doctor blade. (a) of FIG. 4 shows a state of the surface in which the quality of scraping is unfavorable. (b) of FIG. 4 shows a state of the surface in which the quality of scraping is favorable.

FIG. 4 consists of photographs each showing a state of the surface of the coating roller 5 from which the coating solution 8 has been scraped off by the doctor blade 1. (a) of FIG. 4 shows a state of the surface in which the quality of scraping is unfavorable. (b) of FIG. 4 shows a state of the surface in which the quality of scraping is favorable.

In a case where the separator 9 is coated with the coating solution 8 by the coating roller 5 over a long coating length, there will be a deterioration in the quality of scraping of the coating solution 8 from the coating roller 5 by the doctor blade 1, as shown in section A of (a) of FIG. 4. In a case where the doctor blade 1 has a low durability and the quality of scraping deteriorates after a comparatively short coating length, the doctor blade 1 must be replaced with greater frequency, thus causing the problem of reducing the operation rate of the coating device 10. As such, in selecting a material of the doctor blade 1 and the shape of an edge of the doctor blade 1, it is necessary to consider (i) the quality of scraping of the coating solution 8 from the coating roller 5 and (ii) the coating length for which the doctor blade 1 is usable (durability).

In the following descriptions, the term "coating length" will be used to refer to a length over which the coating solution 8 was applied via the coating roller 5, up to a point where there is a deterioration in the quality of scraping of the coating solution 8 from the coating roller 5 by the doctor blade 1.

Figure 5:
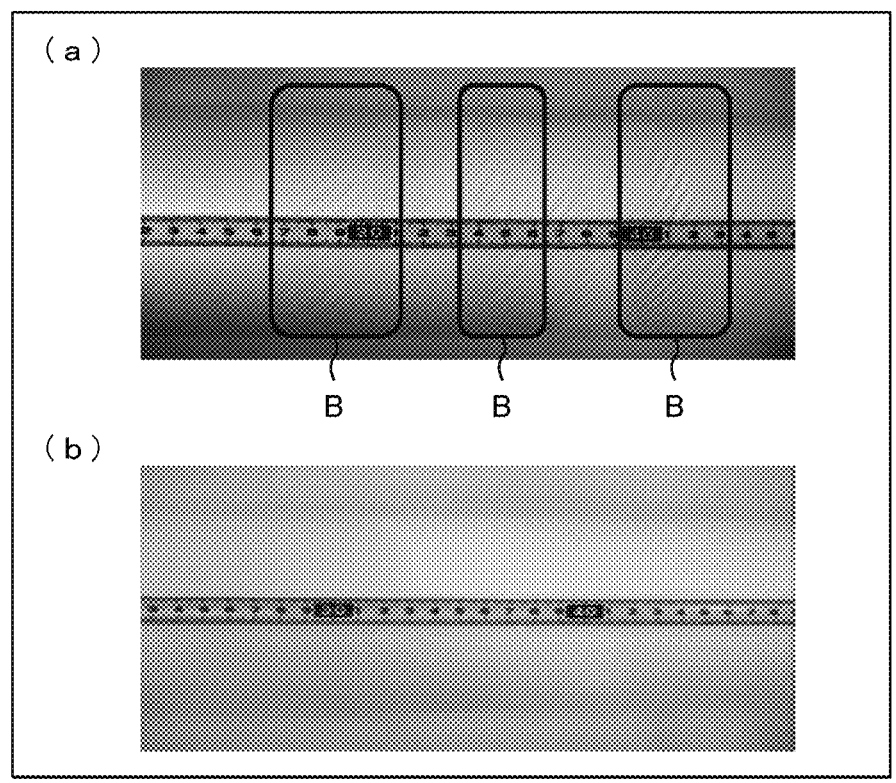
FIG. 5 consists of photographs each showing a state of a surface of a roll original sheet obtained by taking up a separator after (i) the doctor blade scrapes off the coating solution from the coating roller and (ii) the coating roller applies the coating solution to the separator. (a) of FIG. 5 shows a state of the surface in which the quality of application is unfavorable. (b) of FIG. 5 shows a state of the surface in which the quality of application is favorable.

FIG. 5 consists of photographs each showing a state of a surface of a roll original sheet obtained by taking up the separator 9 after (i) the doctor blade 1 scrapes off the coating solution 8 from the coating roller 5 and (ii) the coating roller 5 applies the coating solution 8 to the separator 9. (a) of FIG. 5 shows a state of the surface in which the quality of application is unfavorable. (b) of FIG. 5 shows a state of the surface in which the quality of application is favorable.

(a) of FIG. 5 shows the state of the surface of the roll original sheet which state corresponds to the coating roller 5 shown in (a) of FIG. 4, which coating roller 5 has a surface exhibiting unfavorable quality of scraping. As can be seen in section B of (a) of FIG. 5, wrinkling has been created in the surface of roll original sheet.

In order to solve a problem with regards to using a coating roller to apply a coating solution containing a filler to a battery member being conveyed, specifically, the problem of making it possible to perform such coating over a long distance while maintaining a favorable quality with which the coating solution is scraped off from a circumferential surface of the coating roller, the inventors arrived at forming the surface of the doctor blade 1 from a non-conductive material. Examples of the non-conductive material include resin and ceramic materials.

(Analysis of Equipment Settings and Edge Shape of Doctor Blade 1)

The inventors focused particularly on resin as a material for the surface of the doctor blade 1. The inventors conducted analysis of equipment settings and edge shape of the doctor blade 1 via tests using blades made of ultra-high molecular weight polyethylene (UHPE, blade name: Meilar), polyester (blade name: Maniveil), and polyacetal (blade name: PS).

FIG. 6 consists of diagrams illustrating edge shapes of the doctor blade 1. (a), (b), and (c) of FIG. 6 illustrate a straight shape, a stepped shape, and a tapered shape, respectively. A "straight shape" refers to a shape where the doctor blade 1 has a base section 2 and an edge section 3 which are both plate-shaped and formed to have the same thickness, as illustrated in (a) of FIG. 6. A "stepped shape" refers to a shape where the doctor blade 1 has a base section 2 and an edge section 3 which are both plate-shaped but where the edge section 3 is formed to be thinner than the base section 2, as illustrated in (b) of FIG. 6. A "tapered shape" refers to a shape where the doctor blade as an edge section 3 which becomes increasingly thinner toward the edge of the doctor blade 1, as illustrated in (c) of FIG. 6.

TABLE 1

| | Blade name | Material |
|---|---|---|
| No. 30 | PS | Polyacetal |
| No. 9 | Maniveil | Polyester |
| No. 15 | Meilar | UHPE |

As shown in Table 2, firstly, a test was conducted using the doctor blade 1 whose surface was made of the Meilar blade material, in order to analyze blade bend distance and blade pressure. In the test, the edge shape of the doctor blade 1 was straight, and the bevel angle θ2 was set to 50°. Here, "blade bend distance" refers to a length of a portion of the edge section 3 which portion bends when the doctor blade 1 is pressed onto the circumferential surface 6 of the coating roller 5. For example, a blade bend distance of 0 mm indicates a state where even after the doctor blade 1 blade is pressed onto the circumferential surface 6, no bending is observed in the edge section 3, and the doctor blade 1 remains straight while in contact with the coating roller 5. As another example, a blade bend distance of 9 mm indicates that bending is observed in a portion having a length of 9 mm, measured from the edge of the doctor blade 1. Note also that "blade pressure" refers to the pressure with which the edge of the doctor blade 1 is pressed onto the circumferential surface 6 of the coating roller 5. As shown in Table 2, a blade bend distance of 11 mm and a blade pressure 0.03 MPa, as in Example No. 9, resulted in favorable quality of scraping being maintained over a coating length of 12,000 m, and thus these equipment settings were found to be optimal for the Meilar blade.

TABLE 2

| Meilar (Straight, bevel angle: 50°) | | | |
|---|---|---|---|
| Blade Bend Distance mm | Blade Pressure MPa | Quality of Scraping | Coating length m |
| No. 1    9 | 0 | P | — |
| No. 2 | 0.015 | P | — |
| No. 3 | 0.03 | P | — |
| No. 4    10 | 0 | P | — |
| No. 5 | 0.015 | P | — |
| No. 6 | 0.03 | P | — |
| No. 7    11 | 0 | F | — |
| No. 8 | 0.015 | F | — |
| No. 9 | 0.03 | G | 12,000 |

In the above table,
P = Poor,
F = Fair, and
G = Good.

Next, as shown in Table 3, a test was conducted using the doctor blade 1 whose surface was made of the Maniveil blade material, in order to analyze blade bend distance and blade pressure. Similarly to the Meilar test above, the edge shape of the doctor blade 1 was straight, and the bevel angle θ2 was set to 50°. As shown in Table 3, a blade bend distance of 10.5 mm and a blade pressure 0.04 MPa, as used in Example No. 15, resulted in favorable quality of scraping being maintained over a coating length of 6,000 m, and thus these equipment settings were found to be optimal for the Maniveil blade.

TABLE 3

Maniveil (Straight, bevel angle: 50°)

|  | Blade Bend Distance mm | Blade Pressure MPa | Quality of Scraping | Coating length m |
|---|---|---|---|---|
| No. 10 | 9 | 0.02 | F | — |
| No. 11 |  | 0.03 | F | — |
| No. 12 |  | 0.04 | F | — |
| No. 13 | 10.5 | 0.02 | G | — |
| No. 14 |  | 0.03 | G | — |
| No. 15 |  | 0.04 | G | 6,000 |

In the above table,
P = Poor,
F = Fair, and
G = Good.

(a), (b), and (c) of FIG. 7 each illustrate a state of contact between (i) the edge section 3 of the doctor blade 1 and (ii) the circumferential surface 6 the coating roller 5. Presumably, in a case where the blade pressure is low and the blade bend distance is short, an upper end of the contact surface 4 of the edge section 3 contacts the circumferential surface 6, as shown in (a) of FIG. 7. Conversely, in case where the blade pressure is high and the blade bend distance is long, it is presumably a lower end of the contact surface 4 which contacts the circumferential surface 6, as shown in (c) of FIG. 7. A combination of an optimized blade pressure and an optimized blade bend distance presumably results in the entirety of the contact surface 4 contacting the circumferential surface 6, as shown in (b) of FIG. 7.

(a), (b), and (c) of FIG. 8 are each a diagram for describing an angle of contact between (i) the edge section 3 of the doctor blade 1 and (ii) the circumferential surface 6 of the coating roller 5.

The edge section 3 of the doctor blade 1 bends when pressed onto the circumferential surface 6 of the coating roller 5. Specifically, bending occurs in a portion of the edge section 3 which portion spans from (i) the edge of the doctor blade to (ii) a point distanced from the edge by the blade bend distance. Bending of the edge section 3 results in an angle of contact θ4, as seen in (b) of FIG. 8, which is smaller than an angle of contact θ3 occurring in a case where no bending occurs, as seen in (a) of FIG. 8.

(a) of FIG. 9 is a schematic view for describing the angle of contact θ4 between the edge section 3 of the doctor blade 1 and the surface of the coating roller 5. (b) of FIG. 9 is a schematic view for describing an angle of contact θ5 between the edge section 3 of the doctor blade 1 and the surface of another coating roller 5A. (c) of FIG. 9 is a schematic view for describing the difference between the angles of contact θ4 and θ5.

The angle of contact between the doctor blade 1 and the coating roller 5 is formed specifically by (i) a line L1 tangent to the coating roller 5 at a point where the doctor blade 1 contacts the coating roller 5 and (ii) the edge section 3 of the doctor blade 1. The coating device is designed for this angle of contact to be 35°, but, in actuality, pressing the doctor blade 1 against the surface of the coating roller 5 causes bending to occur. This results in the angle of contact θ4 which is, for example, 27°, and which is less than the planned angle of 35°.

In a case where the doctor blade 1 is pressed onto another coating roller 5A having a diameter differing from that of the coating roller 5, the angle of contact θ5 is formed by (i) a line L2 tangent to the coating roller 5A at a point where the doctor blade 1 contacts the coating roller 5A and (ii) the edge section 3 of the doctor blade 1. The angle of contact θ5 is, for example, 39°, and is greater that the angle of contact θ4 seen in the case of the coating roller 5.

In this way, the angle of contact, between the doctor blade 1 and a coating roller, differs in accordance with the dimensions of the coating roller. For this reason, the blade bend distance and the blade pressure were analyzed as equipment settings, as shown in Tables 2 and 3.

Next, a test was conducted to analyze edge conditions (edge shape and bevel angle) of the doctor blade 1 whose surface was made of the Meilar material. The test used the optimal equipment settings for the Meilar blade as used in Example No. 9 of Table 2, namely, a blade bend distance of 11 mm and a blade pressure of 0.03 MPa. As shown in Table 4, out of the edge shapes of straight, stepped, and tapered, stepped was the most favorable.

With regards to bevel angles in the range from 30° to 50°, a greater bevel angle corresponded to a longer coating length. A bevel angle of 60° however, resulted in deterioration in the quality of scraping. A similar trend was observed with regards to the Maniveil blade (described later). As shown in Table 4, a stepped edge shape and a bevel angle of 50°, as used in Example No. 21, resulted in favorable quality of scraping being maintained over a coating length of 30,000 m, and thus these edge conditions were found to be optimal for the Meilar blade.

TABLE 4

Meilar (Blade bend distance: 11 mm, blade pressure: 0.03 MPa)

|  | Edge Shape | Bevel Angle Degrees | Quality of Scraping | Coating Length m |
|---|---|---|---|---|
| No. 16 | Straight | 30 | G | 3,000 |
| No. 17 |  | 40 | G | 12,000 |
| No. 9 |  | 50 | G | 12,000 |
| No. 18 |  | 60 | P | — |
| No. 19 | Stepped | 30 | G | 5,000 |
| No. 20 |  | 40 | G | 22,000 |
| No. 21 |  | 50 | G | 30,000< |
| No. 22 | Tapered | 0 | P | — |

In the above table,
P = Poor,
F = Fair, and
G = Good.

Next, a test was conducted to analyze edge conditions (edge shape and bevel angle) of the doctor blade 1 whose surface was made of the Maniveil material. The test used the optimal equipment settings for the Maniveil blade as used in Example No. 15 of Table 3, namely, a blade bend distance of 10.5 mm and a blade pressure of 0.04 MPa. As shown in Table 5, out of the edge shapes of straight, stepped, and tapered, straight was the most favorable. With the straight edge shape, a bevel angle of 60° resulted in deterioration in the quality of scraping, similarly to the Meilar blade. As is shown in Table 5, a straight edge shape and a bevel angle of 50°, as used in Example No. 15, resulted in favorable quality of scraping being maintained over a coating length of 6,000 m, and thus these edge conditions were found to be optimal for the Maniveil blade.

TABLE 5

Maniveil

|  | Edge Shape | Bevel Angle Degrees | Quality of Scraping | Coating Length m |
|---|---|---|---|---|
| No. 23 | Straight | 30 | G | 6,000 |
| No. 24 |  | 40 | G | 5,000 |
| No. 15 |  | 50 | G | 6,000 |
| No. 25 |  | 60 | P | — |
| No. 26 | Stepped | 0 | P | — |
| No. 27 | Tapered | 0 | F | — |

In the above table,
P = Poor,
F = Fair, and
G = Good.

Next, a test was conducted in order to analyze edge conditions (edge shape and bevel angle) of the doctor blade 1 whose surface was made of polyacetal (blade name: PS). As shown in Table 6, none of the edge conditions resulted in a favorable quality of scraping.

TABLE 6

PS

|  | Edge Shape | Bevel Angle Degrees | Quality of Scraping | Coating Length m |
|---|---|---|---|---|
| No. 28 | Straight | 30 | F | — |
| No. 29 |  | 40 | F | — |
| No. 30 |  | 50 | F | — |
| No. 31 |  | 60 | P | — |
| No. 32 | Stepped | 0 | P | — |

TABLE 6-continued

PS

|  | Edge Shape | Bevel Angle Degrees | Quality of Scraping | Coating Length m |
|---|---|---|---|---|
| No. 33 |  | 30 | F | — |
| No. 34 |  | 40 | F | — |
| No. 35 |  | 50 | F | — |
| No. 36 |  | 60 | P | — |
| No. 37 | Tapered | 0 | P | — |

In the above table,
P = Poor,
F = Fair, and
G = Good.

FIG. 10 is a graph indicating the respective coating lengths of various doctor blades. The doctor blade of Example No. 15 of Tables 3 and Table 5, which was a Maniveil blade having a blade bend distance of 10.5 mm, a blade pressure of 0.04 MPa, a straight edge shape, and a bevel angle of 50°, resulted in a coating length of 6,000 m.

In contrast, the doctor blade of Example No. 20 of Tables 2 and Table 4, which was a Meilar blade having a blade bend distance of 11 mm, a blade pressure of 0.03 MPa, a stepped edge shape, and a bevel angle of 40°, resulted in a coating length of 22,000 m. This coating length is approximately 3.7 times level P1, which refers to a level equivalent to the 6,000 m seen in Example No. 15.

Furthermore, the doctor blade of Example No. 21 of Tables 2 and 4, which was a Meilar blade having a bevel angle of 50°, resulted in a coating length of 30,000 m. This coating length is approximately 5 times level P1 and is a significant increase over that of Example No. 15.

TABLE 7

Change in weight per unit area in machine direction at various lengths of coating (Weight per unit area at 250 m point − weight per unit area at final measurement point)

|  | 5,000 m g/m² | 10,000 m g/m² | 15,000 m g/m² | 20,000 m g/m² | 25,000 m g/m² | 30,000 m g/m² | Change in Weight per Unit Mass at Final Point g/m² | Final Coating Length m |
|---|---|---|---|---|---|---|---|---|
| No. 15 | 0.3 | — | — | — | — | — | 0.3 | 6,000 |
| No. 16 | — | — | — | — | — | — | 2.3 | 3,000 |
| No. 17 | 0.5 | 0.5 | — | — | — | — | 0.8 | 12,000 |
| No. 9 | 0.4 | 0.4 | — | — | — | — | 0.6 | 12,000 |
| No. 19 | 0.4 | — | — | — | — | — | 0.4 | 5,000 |
| No. 20 | −0.1 | −0.4 | 0.2 | 0.4 | — | — | 0.6 | 22,000 |
| No. 21 | 0.1 | 0.2 | 0.1 | 0.2 | 0.1 | 0.4 | 0.4 | 30,000< |

TABLE 8

Variation in weight per unit area in transverse direction at various lengths of coating (maximum weight per unit area − minimum weight per unit area)

|  | 250 m g/m² | 5,000 m g/m² | 10,000 m g/m² | 15,000 m g/m² | 20,000 m g/m² | 25,000 m g/m² | 30,000 m g/m² | Variation in Weight per Unit Mass at Final Point g/m² | Final Coating Length m |
|---|---|---|---|---|---|---|---|---|---|
| No. 15 | 0.3 | 0.3 | — | — | — | — | — | 0.2 | 6,000 |
| No. 16 | 0.4 | — | — | — | — | — | — | 0.8 | 3,000 |
| No. 17 | 0.5 | 0.3 | 0.4 | — | — | — | — | 0.5 | 12,000 |
| No. 9 | 0.3 | 0.3 | 0.2 | — | — | — | — | 0.2 | 12,000 |
| No. 19 | 0.8 | 0.3 | — | — | — | — | — | 0.2 | 5,000 |

TABLE 8-continued

Variation in weight per unit area in transverse direction at various lengths
of coating (maximum weight per unit area − minimum weight per unit area)

|  | 250 m g/m² | 5,000 m g/m² | 10,000 m g/m² | 15,000 m g/m² | 20,000 m g/m² | 25,000 m g/m² | 30,000 m g/m² | Variation in Weight per Unit Mass at Final Point g/m² | Final Coating Length m |
|---|---|---|---|---|---|---|---|---|---|
| No. 20 | 0.4 | 0.3 | 0.3 | 0.5 | 0.2 |  | — | 0.5 | 22,000 |
| No. 21 | 0.7 | 0.3 | 0.5 | 0.3 | 0.7 | 0.9 | 0.7 | 0.7 | 30,000< |

Table 7 shows the change in weight per unit area in the machine direction (MD; lengthwise direction) as observed when using various doctor blades. Table 8 shows unevenness in weight per unit area in the transverse direction (TD) as observed when using various doctor blades. Here, "machine direction" refers to a direction in which a separator is conveyed during production, whereas "transverse direction" refers to a direction which is substantially perpendicular to (i) the machine direction and (ii) a thickness-wise direction of the separator.

In the tests performed, the quality with which the doctor blade 1 scraped off the coating solution was observed by (i) partially immersing a gravure roll into a pan filled with a coating solution 8 containing an alumina filler, (ii) rotating the gravure roll, without a separator being in contact therewith, while pressing the doctor blade 1 thereon at a specific contact pressure and angle, and (iii) subsequently visually observing the quality of scraping.

(a) of FIG. 11 is a photograph showing defective scraping off of the coating solution, from the circumferential surface 6 of the coating roller 5, by the doctor blade 1 during coating. (b) is a photograph showing wrinkles 12a and 12b seen in a roll original sheet 11 after coating. As shown in (a) of FIG. 11, the defective scraping off appears as variation in the thickness of the coating solution on the circumferential surface 6 after scraping off has been performed. Region B exhibits a normal variation between a more thickly coated portion 13 and a more thinly coated portion 14. Variation resulting from defective scraping off, however, can be seen in (i) a more thickly coated portion 13a and a more thinly coated portion 14a of region R1 and (ii) a more thickly coated portion 13b and a more thinly coated portion 14b of region R2.

Abrasion of the doctor blade 1 causes variations in the thickness of dope on the coating roller 5 which indicate defective scraping by the doctor blade. This causes a weight per unit area of a coating layer to become non-uniform and, therefore, causes wrinkles in the roll original sheet 11 of the separator. (b) of FIG. 11 shows (i) wrinkles 12a in a region S1 of the surface of the roll original sheet 11 and (ii) wrinkles 12b in a region S2.

FIG. 12 is a diagram for describing a sampling method used for measuring a weight per unit area of a coating layer of the separator 9.

Samples used for measuring the weight per unit area of the coating layer were produced as follows. The coating solution 8 was applied to the polyethylene porous film of the separator 9, which was subsequently dried. A point, on the separator 9, positioned 250 m from an end of the separator in the machine direction, was considered to be an initial state. Samples were first taken at this 250 m point. Thereafter, samples were taken at (i) intervals corresponding to 5,000 m of coating length and/or (ii) a point at which defective scraping off was observed. Specifically, samples measuring 8 cm×8 cm were taken at positions 15a, 15b, and 15c as illustrated in FIG. 12, and a difference in weight per unit area between (i) the respective samples and (ii) a un-coated portion were calculated. The weight per unit area W2 of the coating layer was then calculated using the formula F1 below, where W1 is the weight (in grams) of a coated specimen and W0 is the weight (in grams) of an uncoated piece of polyethylene porous film having the same area. Note that (i) the position 15a is in the center of the separator 9 in the transverse direction, (ii) the position 15b is located 10 cm inward, in the transverse direction, from an end of the separator 9, and (iii) the position 15c is located 10 cm inward, in the transverse direction, from another end of the separator 9.

$$W2=(W1-W0)\div 64\times 10{,}000\ (g/m^2) \quad \text{Formula F1:}$$

Change in the weight per unit area, of the coating layer, in the machine direction was evaluated by comparing respective weights per unit area of central-position samples taken at each sampling point. Specifically, for each sample taken at position 15a at each sampling point, the weight per unit area thereof was subtracted from the weight per unit area observed at the 250 m point, which was considered to indicate an initial state. Table 7 shows the result of these calculations.

In-plane variation in the weight per unit area at each sampling point was evaluated as the difference between a maximum and minimum weight per unit area of specimens taken at three points (the positions 15a, 15b, and 15c) along the width of the coating. Table 8 shows the result of these calculations.

A maximum acceptable change in weight per unit area in the machine direction, which is set in accordance with actual performance during production, is 3 g/m². Although the weight per unit area will change along the machine direction as the doctor blade 1 is abraded, if this change is not greater than 3 g/m², it is possible to keep a constant weight per unit area by using an automatic control system to adjust a velocity ratio. As shown in Example No. 21 of Table 7, a doctor blade utilizing the Meilar blade material having a stepped edge shape and a bevel angle of 50° exhibited a level of change in the weight per unit area in the machine direction which level was far less than 3 g/m², even at a final point. As such, this doctor blade proved to be extremely favorable.

A maximum acceptable variation of weight per unit area in the transverse direction, which is set in accordance with actual performance during production, is 1 g/m². This value of 1 g/m² corresponds to a variation in weight per unit area in the transverse direction which makes it possible to prevent winding misalignment and looseness in an exterior of a roll obtained by winding the separator 9. As shown in Example No. 21 of Table 8, the doctor blade utilizing the Meilar blade material and having a stepped edge shape and a bevel angle of 50° exhibited a level of variation in the weight per unit area, in the transverse direction, which level was far less than 1 g/m², even at a final point. As such, this doctor blade proved to be extremely favorable.

In Embodiment 1, the separator 9 served as an example of an object to be coated with the coating solution 8, containing the filler, by use of the coating roller 5. Note, however, that this example is non-limiting. The object to be coated need only be a battery member and can be, for example, a cathode member or an anode member.

(Recapitulation)

In order to solve the above problem, a doctor blade in accordance with an embodiment of the present invention is a doctor blade for scraping off a coating solution, containing a filler, from a circumferential surface of a coating roller, the coating roller being for applying the coating solution to a battery member being conveyed, the doctor blade including: a surface made from a non-conductive material.

With the above configuration, the surface of the doctor blade is made from a non-conductive material. This prevents the creation of abrasion powder which would become a conductive foreign substance, even in a case where the doctor blade is worn down by the filler contained in the coating solution.

A doctor blade in accordance with an embodiment of the present invention is preferably arranged such that the non-conductive material contains a resin.

With the above configuration, the surface of the doctor blade is made from resin and is therefore resistant to chipping. This brings about an effect of effectively preventing the filler contained in the coating solution from wearing down the doctor blade. Furthermore, even in a case where the doctor blade is worn down, abrasion powder created from resin tends not to be in the form of coarse particles. Still further, forming the surface of the doctor blade from resin imparts elasticity to the doctor blade, thus enabling the doctor blade to (i) better contact the surface of the gravure roll and (ii) effectively scrape off of the coating solution therefrom.

A doctor blade in accordance with an embodiment of the present invention is preferably arranged such that the resin contains an ultra-high molecular weight polyethylene.

With the above configuration, the surface of the doctor blade is made from ultra-high molecular weight polyethylene and is therefore highly durable. This brings about an effect of even more effectively preventing the filler contained in the coating solution from wearing down the doctor blade. Furthermore, since ultra-high molecular weight polyethylene is used as a material for the separator itself, even in a case where the ultra-high molecular weight polyethylene is worn down and the resulting abrasion powder is introduced into the separator, the abrasion powder can exist stably in a battery without inhibiting reactions in the battery.

A doctor blade in accordance with an embodiment of the present invention is preferably arranged such that an edge section of the doctor blade is thinner than a base section of the doctor blade so that the doctor blade has a stepped shape, the edge section and the base section each being plate-shaped The above configuration makes it possible to extend the coating length for which the doctor blade can be used to scrape off the coating solution, and thus reduces the frequency with which the doctor blade must be replaced.

A doctor blade in accordance with an embodiment of the present invention is preferably arranged such that an edge section of the doctor blade, which edge section is plate-shaped, has a contact surface which is pressed onto the circumferential surface of the coating roller; and a bevel angle formed by the contact surface and a surface of the edge section is less than 60° but not less than 30°.

The above configuration makes it possible to extend the coating length for which the doctor blade can be used to scrape off the coating solution, and thus reduces the frequency with which the doctor blade must be replaced.

A doctor blade in accordance with an embodiment of the present invention is preferably arranged such that the edge section has a contact surface which is pressed onto the circumferential surface of the coating roller; and a bevel angle formed by the contact surface and a surface of the edge section is less than 60° but not less than 30°.

The above configuration makes it possible to extend the coating length for which the doctor blade can be used to scrape off the coating solution, and thus reduces the frequency with which the doctor blade must be replaced.

A doctor blade in accordance with an embodiment of the present invention is preferably arranged such that the battery member is a separator.

The above configuration makes it possible to prevent wearing down of the doctor blade by the coating solution containing the filler.

A doctor blade in accordance with an embodiment of the present invention is preferably arranged such that the filler is an inorganic filler.

With the above configuration, since the inorganic filler has heat resistance, even in a case where a base film of the separator melts, a cathode and an anode will continue to be insulated from each other thereafter.

A doctor blade in accordance with an embodiment of the present invention is preferably arranged such that the filler has a Mohs hardness of not less than 4.

With the above configuration, the filler has a certain hardness or greater. This prevents deformation and fragmentation of a heat-resistant layer caused by outside forces such as expansion and contraction of a battery.

A doctor blade in accordance with an embodiment of the present invention is preferably arranged such that the filler contains an inorganic oxide.

The above configuration imparts favorable heat resistance and chemical stability to a heat-resistant layer of a separator.

In order to solve the above problem, a coating device in accordance with an embodiment of the present invention includes: a coating roller for applying a coating solution, containing a filler, to a battery member being conveyed; and a doctor blade for scraping off the coating solution from a circumferential surface of the coating roller, the doctor blade including a surface made from a non-conductive material.

In order to solve the above problem, a method for producing laminated separator in accordance with an embodiment of the present invention includes: forming a coating layer on a separator by applying a coating solution to the separator by use of a coating device configured in accordance with an embodiment of the present invention.

The present invention is not limited to the embodiments, but can be altered by a skilled person in the art within the scope of the claims. An embodiment derived from a proper combination of technical means each disclosed in a different embodiment is also encompassed in the technical scope of the present invention.

REFERENCE SIGNS LIST

1 Doctor blade
2 Base section
3 Edge section

3A Surface
4 Contact surface
5 Coating roller
6 Circumferential surface
9 Separator (laminated separator)
θ2 Bevel angle

The invention claimed is:

1. A coating device comprising:
a coating roller for applying a coating solution containing a filler to a battery member being conveyed; and
a doctor blade for scraping off the coating solution from a circumferential surface of the coating roller,
the doctor blade including a surface made from a non-conductive material, wherein:
a plate-shaped edge section of the doctor blade has a contact surface which is pressed onto the circumferential surface of the coating roller;
a bevel angle formed by the contact surface and a surface of the edge section is less than 60° but not less than 30°, and
a contact angle formed from (i) a line tangent to the circumferential surface of the coating roller at a point where the edge section contacts the circumferential surface and (ii) the surface of the edge section is 60°±10°.

2. The coating device as set forth in claim 1, wherein the contact surface entirely contacts the circumferential surface of the coating roller.

3. A coating device comprising:
a coating roller for applying a coating solution containing a filler to a battery member being conveyed; and
a doctor blade for scraping off the coating solution from a circumferential surface of the coating roller,
the doctor blade including a surface made from a non-conductive material containing a resin containing an ultra-high molecular weight polyethylene,
wherein an edge section of the doctor blade is thinner than a base section of the doctor blade so that the doctor blade has a stepped shape, the edge section and the base section each being plate-shaped, wherein:
the edge section has a contact surface which is pressed onto the circumferential surface of the coating roller;
a bevel angle formed by the contact surface and a surface of the edge section is less than 60° but not less than 30°, and
a contact angle formed from (i) a line tangent to the circumferential surface of the coating roller at a point where the edge section contacts the circumferential surface and (ii) the surface of the edge section is 60°±10°.

4. The coating device as set forth in claim 3, wherein the contact surface entirely contacts the circumferential surface of the coating roller.

* * * * *